(12) United States Patent
Mabbott

(10) Patent No.: US 11,408,183 B1
(45) Date of Patent: Aug. 9, 2022

(54) INTEGRATED IMAGE LAYER CONSTRUCTIONS

(71) Applicant: Robert J. Mabbott, Sarasota, FL (US)

(72) Inventor: Robert J. Mabbott, Sarasota, FL (US)

(73) Assignee: INTEGR8, INC., Bradenton, FL (US)

( * ) Notice: Subject to any disclaimer, the term of this patent is extended or adjusted under 35 U.S.C. 154(b) by 0 days.

(21) Appl. No.: 16/542,435

(22) Filed: Aug. 16, 2019

Related U.S. Application Data

(60) Provisional application No. 62/755,533, filed on Nov. 4, 2018.

(51) Int. Cl.
*B32B 3/00* (2006.01)
*E04F 15/10* (2006.01)
*B44C 1/10* (2006.01)
*B32B 7/12* (2006.01)
*B32B 27/10* (2006.01)
*E04F 15/02* (2006.01)
*B44C 1/165* (2006.01)

(52) U.S. Cl.
CPC ............ *E04F 15/107* (2013.01); *B32B 7/12* (2013.01); *B32B 27/10* (2013.01); *B44C 1/105* (2013.01); *B32B 2307/726* (2013.01); *B44C 1/165* (2013.01); *E04F 15/0215* (2013.01)

(58) Field of Classification Search
CPC . E04F 15/107; B32B 2607/00; B32B 2451/00
See application file for complete search history.

(56) References Cited

U.S. PATENT DOCUMENTS

| | | | | |
|---|---|---|---|---|
| 3,953,564 | A | * | 4/1976 | Weidman ................ B44C 1/04 264/78 |
| 6,410,617 | B1 | * | 6/2002 | Sulzbach ............... C08G 59/62 523/404 |
| 6,722,271 | B1 | * | 4/2004 | Geddes .................... B41M 3/12 101/33 |
| 2011/0174180 | A1 | * | 7/2011 | Calderas ................ D21H 19/82 101/483 |

* cited by examiner

*Primary Examiner* — Elizabeth E Mulvaney
(74) *Attorney, Agent, or Firm* — Edward M. Livingston, Esq.; Livingston Law, P.A.

(57) ABSTRACT

An integrated image layer construction and method of making same resulting in a homogenous mix which can be applied it to a target surface, such as a surface of a floor, wall tile or other hard surface, to yield a durable, resistant form of decoration.

8 Claims, 3 Drawing Sheets

INTEGRATED IMAGE LAYER CONSTRUCTIONS

CROSS REFERENCE TO RELATED APPLICATION

This application claims the benefit of priority to provisional patent application 62/755,533 filed Nov. 4, 2018.

FIELD OF THE INVENTION

The present invention relates to an integrated image layer construction and methods of making same, more particularly to a method of creating a homogenous mix and applying it as a form of decoration, to floor or wall tiles or other types of hard surface construction material, before during or after installation.

BACKGROUND OF THE INVENTION

Screen printing is a printing technique whereby a mesh is used to transfer ink onto a material surface. One color is printed at a time, so several screens can be used to produce a multicolored image or design. In the tile industry screen printing has traditionally been the method used to decorate floor and wall tiles. Decoration of the tiles is an integral part of the tile manufacturing process as it comes before the final stage of production, which is to fire the tiles in a kiln at temperatures reaching 1200° C. for an hour or more depending on the number of inks and glazes used to create the final decorated tile. The firing process solidifies the body of the tile and fuses the decoration to the tile surface. However, the traditional tile manufacturing and decoration process has several problematic areas that need to be addressed, including high set-up costs, long production cycles, high cost of ownership and difficulty in tile to tile color matching, because of degradation of the inks caused by the extremely high temperatures they are subjected to.

In recent years though, the tile manufacturing process has become more streamlined and the traditional tile screen printing decoration process has been slowly replaced with advanced digital printing technology that uses special formulated ceramic inkjet inks to eliminate the color matching issues, however, with all the huge advantages that digital decoration has brought to the tile industry, it is still part of the production process and still comes before the biggest bottleneck of all, the kiln firing process, deemed necessary to meet the quality standards associated with each type of tile.

There are other tile decoration methods, like hand painting, dye sublimation, heat transfer, water-slide decal and UV cure, direct to tile inkjet printing, but they are all either still reliant on the kiln firing process or they are designed for purely decorative purposes and fail to meet the performance standards required for commercial tile application.

Floor and wall tile decoration of the types described are all also to be considered problematic in the fact that the decoration processes as described above cannot be used on any floor or wall tile that has been previously installed. However, there are also floor and wall tiles that are not reliant on the kiln firing process, these are collectively called peel and stick tiles, which are made predominately out of vinyl and other polymeric material alternatives. These types of tile have mainly found commercial acceptance because of their low price, greater versatility and ease of application and being that they are self-adhesive, they are easy to apply and can be installed over existing floor and wall tile installations. However, with all their apparent advantages, the decorative element of a peel and stick tile is integrated into the manufacturing process and the final product at best is an imitation of a traditionally made ceramic or porcelain tile.

Therefore, there is a need for a hard, durable, resistant form of floor and wall tile decoration that has all the advantages of direct digital inkjet tile printing without the problems emanating from reliance on the kiln firing process. There is also a need for a hard, durable, resistant form of floor and wall tile decoration that has the ease of application of a peel and stick tile, which can be applied to new and existing floor and wall tiles before, during or after installation, while retaining all the structure, integrity and performance of the traditionally made ceramic or porcelain tile itself.

SUMMARY OF THE INVENTION

Accordingly, the present invention has been devised to solve the aforementioned problems in that it provides for a method of making an integrated image layer construction, creating a clear homogenous mix and thereafter applying it to hard surface construction materials, which surfaces may include ceramic or porcelain floor or wall tiles, applied thereto as a hard, durable, resistant form of decoration, before, during or after installation.

There has been outlined rather broadly some of the features of an integrated image layer construction and in order that the detailed description thereof may be better understood and that the present contribution to the art may be better appreciated, there are additional features of the present invention that will be described hereinafter which will form the subject matter of the claims appended hereto. In this respect, before explaining at least one embodiment of the present invention, it should be understood that integrated image layer construction is not limited in its application to the details of integrated image layer construction or to the equipment or methods of application used to deliver image layer constructions to target surfaces as set forth in the following descriptions or drawings; moreover there are other hard surface materials which the present invention may be applicable to apart from ceramic or porcelain floor and wall tiles and that the same conventions of process application and to which subsequent result may apply. Therefore, it should also be readily understood that the phraseology and terminology employed herein is for descriptive purposes only and should not be regarded as limiting.

A preferred embodiment of the present invention, provides for the making of an integrated image layer construction comprised of; coating a first releasable carrier with an absorbable layer, printing said layer with an absorbable ink, coating a second releasable carrier with an adhesive layer, which layer may comprise a pressure sensitive, which may be permanent, applying the adhesive layer to the printed face of the absorbable layer, peeling the first releasable carrier cleanly away from the absorbable layer, which image may appear muted, applying a penetrating resin layer formulated to integrate the image layer into the absorbable layer, curing the penetrating resin, thereafter applying a hard top coat resin layer to the penetrating resin layer, curing the hard coat resin layer, thereby creating a clear homogenous mix thereafter peeling away the second releasable carrier and applying the underlying adhesive layer to a hard surface construction material as a hard, durable, resistant form of decoration.

An object of the present invention is to provide an integrated image layer construction wherein the first releasable carrier may be constructed of a paper which may be laminated with a thin gauge polypropylene material, thereby providing a surface consistent with the requirements of the release of said absorbing layer, which may comprise a white microporous structure consistent with the requirements of receiving and absorbing ink from an aqueous inkjet printer.

Another object of the present invention is to provide an integrated image layer construction wherein the second releasable carrier may be constructed of a paper coated with a release coating which may be of a high release, which may be silicone or another material with similar release characteristics.

Another object of the present invention is to provide an integrated image layer construction wherein the second releasable carrier has an adhesive element applied to its surface and that said element may comprise a pressure sensitive adhesive, which in the context of this specification, refers as in commonly used terminology to a substance that it is permanently sticky and tacky, especially at room temperature. Pressure sensitive adhesive (PSA) is characterized in that it can be applied to a substrate by pressure and adheres thereto permanently under pre-determined conditions.

Another object of the present invention is to provide an integrated image layer construction wherein ink from an inkjet printer may be printed onto and into said absorbing layer, which layer may be constructed of a white microporous coating suitable for the absorption of ink into its surface, wherein such ink may be of the kind used in an aqueous inkjet printer, which for the point of clarity may comprise water based pigment inks with absorbing properties which combination may be available under the brand name EPSON.

Another object of the present invention is to provide an integrated image layer construction wherein the adhesive face of the second releasable carrier is brought in contact with the printed absorbing layer by the action of pressure, so as to effect adhesion sufficient enough to peel the first release carrier cleanly away from the back face of the printed absorbing layer.

Another object of the present invention is to provide an integrated image layer construction wherein the back face of the printed absorbing layer is facing uppermost which on reveal may show the underlying printed image as muted, thereafter applying a liquid penetrating resin, which resin may comprise an epoxy, a polyurethane, a polyester an acrylic, a reduced combination thereof, or any other curable resin combination, which liquid penetrating resin may cause the printed absorbing layer to become clear, which may create a vibrant printed image within the visible surface of the resin, resulting in a clear homogenous mix.

Another object of the present invention is to provide an integrated image layer construction wherein the liquid penetrating resin is hardened by the action of curing, a term that is used in polymer chemistry and process engineering that refers to the toughening or hardening of a polymer material by the cross-linking of polymer chains, brought about by heat, chemical additives or by electron beam.

Another object of the present invention is to provide an integrated image layer construction wherein a top coat resin layer is coated onto the penetrating resin layer, which top coat may comprise resins or components of resins belonging to the same family of resins as the penetrating resin layer, which when cured provides for a clear homogenous mix, which may contain a vibrant image integrated into a hard, durable resistant surface finish.

Another object of the present invention is to provide an integrated image layer construction wherein the second releasable carrier is removed from the clear homogenous mix, thereby revealing the adhesive layer which may be pressure sensitive, wherein such adhesive may comprise a hot melt, a silicone, an acrylic, a rubber, an epoxy or any other such permanent adhesive formulation required to affect the desired adhesion properties.

Another object of the present invention is to provide an integrated image layer construction wherein the adhesive bearing clear homogenous mix which may contain a vibrant image is applied to a ceramic or porcelain floor or wall tile, before, during or after installation.

Another object of the present invention is to provide an integrated image layer construction wherein the surface of the clear homogenous mix, which may contain a vibrant image, is applied to a construction material other than a tile.

An embodiment of the present invention provides for applying the adhesive bearing clear homogenous mix, which may contain a vibrant image to an intermediate sheet which may comprise a thin gauge plastic material, which material may be coated on one side with an adhesive, which may be pressure sensitive, provided with a third releasable carrier, wherein such carrier is peeled from the adhesive bearing intermediate sheet and applied permanently to the target surface which may comprise a ceramic or porcelain floor or wall tile.

Another embodiment of the present invention provides for the making of an integrated image layer construction comprised of; coating a first releasable carrier with an absorbable layer, printing said layer with an absorbable ink, coating an intermediate sheet which may comprise a thin gauge plastic material with an adhesive layer which may comprise a pressure sensitive, pressing the printed absorbing layer to the adhesive face of the intermediate sheet, peeling the first releasable carrier cleanly away from the absorbing layer which on reveal may show the underlying printed image as muted, applying a penetrating resin layer formulated to integrate the image layer into the absorbable layer, curing the penetrating resin, thereafter applying a hard, top coat resin layer to the penetrating resin layer, curing the hard coat resin layer, thereby creating a clear homogenous mix which includes an intermediate sheet, thereafter peeling away the third releasable carrier from the intermediate sheet, and applying the underlying adhesive layer to a target surface as a hard, durable, resistant form of decoration.

Another object of the present invention is to provide an intermediate sheet, which may comprise a thin gauge plastic material as a receiving layer for special effects, which effects may include coating the surface of the intermediate sheet, which may include printing the surface of the intermediate sheet with an ink medium other than aqueous inkjet, which may also include transferring a foil to the intermediate sheet surface or any other method suited to applying special effects thereto.

Another object of the present invention is to provide an intermediate sheet, which may comprise a thin gauge plastic material as a receiving layer for special effects, wherein the effect may comprise special pigments, which may include glow-in-the-dark, iridescent, thermos chromic, nano-metallic and pearlescent, which effect may also comprise special transfer foils, which may include, metallic, diffraction, holographic, 3D or OLED's used to create cinematic displays and special lighting effects.

Another object of the present invention is to provide an intermediate sheet, which may comprise a thin gauge plastic material as a receiving layer for special effects wherein the effect may comprise an ink medium other than aqueous inkjet, which effect may include printing layer on layer with a UV curable ink or 3D printer to create a raised 3D profile or texture.

Another object of the present invention is to provide an intermediate sheet, which may comprise a thin gauge plastic material which may be thermos formable, whereby heat and vacuum may be used to form the thin gauge plastic sheet to a mold which may be comprised of a raised 3D profile or texture.

Another object of the present invention is to provide a vacuum formed intermediate sheet with a raised 3D profile or texture, which intermediate sheet may have been formed with a printed absorbable layer, with a special effects layer or a combination thereof.

According to yet another embodiment of the present invention there is method for making an integrated image layer construction comprised of; coating a first releasable carrier with an absorbable layer, printing said layer with an absorbable ink, coating a second releasable carrier with an adhesive layer, which layer may comprise a porous pressure sensitive, applying the porous adhesive layer to the printed face of the absorbable layer, peeling the second releasable carrier cleanly away from printed face of the absorbable layer, thereafter applying the porous adhesive face of the absorbable layer to a porous hard surface, which may comprise concrete, traditional unglazed tile, grout, limestone, brick or any other hard construction surface or material, which surface may be smooth to ensure the best possible contact. peeling the first releasable carrier cleanly away from the absorbing layer which on reveal may show the underlying printed image as muted, applying a penetrating resin layer formulated to integrate the image layer the absorbable layer and the porous surface, curing the penetrating resin, thereafter applying a hard, top coat resin layer to the penetrating resin layer, curing the hard coat resin layer, thereby creating a clear homogenous mix which includes the porous surface, resulting in a hard, durable, resistant form of decoration.

According to yet another embodiment of the present invention there is method for making an integrated image layer construction comprised of; coating a first releasable carrier with an absorbable layer, printing said layer with an absorbable ink, applying a liquid resin to a hard porous construction material, which may comprise concrete, traditional unglazed tile, grout, limestone, brick or any other hard construction surface or material, which surface may be smooth to ensure the best possible contact; which liquid resin may be that of a type that cures by exothermic reaction, which may comprise an epoxy or polyester, a combination thereof or any other resin that cures with an exothermic reaction, using a bi-component system comprising, part (a) a resin and part (b) a hardener; applying the integrated image layer construction, printed absorbable layer face down onto the surface of the liquid resin, so as to contact the two surfaces together, before, during and after the exothermic reaction; thereafter peeling a first releasable carrier from the hardened resin surface, therein revealing a clear homogenous mix which may contain a vibrant image, thereafter, optionally applying a hard top coat resin to the clear homogenous mix, resulting in a hard, durable, resistant form of decoration.

It should be understood that the examples describing the types of integrated image layer constructions herein that may be used in the application of a clear homogenous mix to hard surface construction materials, as a hard, durable, resistant form of decoration is to be considered by no means exhaustive, accordingly the present invention is not limited to the precise embodiments, drawings or descriptions detailed herein.

BRIEF DESCRIPTION OF THE DRAWINGS

In the following detailed description, reference will be made to the attached drawings in which:

FIG. 1 is a cross section showing a first releasable carrier construction;

FIG. 2 is a cross section the same as FIG. 1 with the addition of a white microporous absorbable layer;

FIG. 3 is a cross section the same as FIG. 2 with the addition of an absorbable ink layer;

FIG. 4 is a cross section the same as FIG. 3 with the addition of a second releasable carrier;

FIG. 5 is a cross section the same as FIG. 4 with the removal of a first releasable carrier thereinafter transposed;

FIG. 6 is a cross section the same as FIG. 5 with the addition of a penetrating resin by which the color of the absorbable layer becomes clear;

FIG. 7 is a cross section the same as FIG. 6 with the addition of hard top coat resin layer, which layer is cross linkable with the penetrating layer, thereinafter creating a clear homogenous mix;

FIG. 8 is a cross section the same as FIG. 7 having been applied to a hard surface construction material, thereby completing the steps of making an integrated image layer construction, creating a clear homogenous mix and applying it to a hard surface construction material;

DESCRIPTION OF PREFERRED EMBODIMENTS

Figure 1:
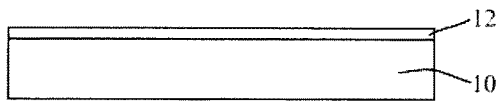
FIGS. 1-8 illustrate a preferred embodiment which comprise the steps of making an integrated image layer construction, creating a clear homogenous mix and applying it to a hard surface construction material, more specifically.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprise" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of steps describing the invention are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. In the following description, for purposes of explanation, numerous specific details are set forth in order to provide a thorough understanding of the present invention. It will be evident, however, to one with ordinary skill in the art that the present invention may be practiced without these specific details. The present disclosure is to be considered as an exemplification of the invention, and is not intended to limit the invention to the specific embodiments illustrated by the figures or to the detailed description herein. The present invention in its simplest and most exemplary form provides for the making of an integrated image layer construction, creating a homogenous mix, thereafter applying it to a hard surface construction material, resulting in a hard, durable form of decoration.

Referring now to a preferred embodiment of the present invention, which provides for the making of an integrated image layer construction comprised of; coating a first releasable carrier with an absorbable layer; printing said layer with an absorbable ink; coating a second releasable carrier with an adhesive layer, which layer may comprise a pressure sensitive; applying the adhesive layer to the printed face of the absorbable layer; peeling the first releasable carrier cleanly away from the absorbable layer, which image may appear muted; applying a penetrating resin layer formulated to integrate the image layer into the absorbable layer; curing the penetrating resin; thereafter applying a hard top coat resin layer to the penetrating resin layer; curing the hard coat resin layer, thereby creating a clear homogenous mix; peeling away the second releasable carrier; thereafter, applying the underlying adhesive layer to a hard surface construction material as a hard, durable, resistant form of decoration. The above preferred embodiment will now be described in detail with reference to the drawing FIGS. 1-8.

For purposes of describing the preferred embodiment, the terminology used in reference to the numbered accessories in the drawings is as follows:

10. first releasable carrier
12. release material
14. absorbable layer
16. image layer
18. second releasable carrier
20. adhesive
22. penetrating resin layer
24. hard top coat resin layer
26. hard surface construction material (e.g., tile)
28. intermediate sheet
30. adhesive
32. third releasable carrier
34. special effects layer
36. porous adhesive layer
40. liquid resin
42. exothermic reaction
46. hard porous surface/target surface
48. homogenous mix FIG. 1 is a cross section showing a first releasable carrier that is constructed to comprise the following: a first releasable carrier 10 that may be made from paper or film of a thickness consistent with its intended use, which use may include, the ability to be made in roll form; being able to be coated with a liquid release material on an industrial coating machine; being able to be laminated on an industrial laminator; or being able to be printed on a roll fed digital inkjet printer; an example of a material that given the parameters of use would fit the requirement, may be a raw based paper with a weight of 170-200 gsm of a thickness of between 200-250 microns. The first releasable carrier 10 coated or laminated with a release material 12 which may be a material with low surface energy like a coated silicone, thereby providing an easy release or may be a laminated release film with a higher surface energy like a thin gauge polypropylene with a preferred thickness of between 34-38 dynes per square centimeter, thereby providing a tighter release. With reference to the first releasable carrier 10 the release material 12 is determined by the material surface that it is both applied to and thereafter released from.

Figure 2:
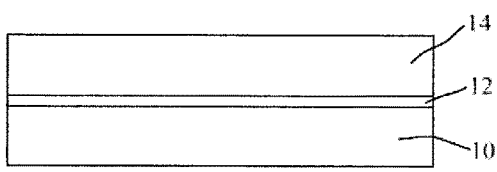

FIG. 2 is a cross section the same as FIG. 1 with the addition of an absorbable layer 14 which in the context of the preferred embodiment refers to an exemplary aspect of the present invention. The absorbable layer 14 may be described as being microporous, a coating material that has micro or nano pores which are either silica or alumina based, designed to absorb water-based pigment ink printed thereon using a digital inkjet printer.

There are different types of microporous coatings commercially available, and one which extensive testing shows is suited well to the preferred embodiment is a liquid microporous material which is marketed under the product name C127-3 as a white matte water-based inkjet liquid coating, available from manufacturer Ontario Specialty Coatings, which coating provides for a 30-70 microns thickness to be coated onto release material 12 using a #38 wire wound bar, or other applicable coating method capable of coating a material thickness of between 30-70 microns. It is a feature of this preferred embodiment for the microporous coating to be white, in that the level of absorption of the clear liquid penetrating resin 22 can clearly be observed as the white microporous absorbable layer 14 gradually changes from white to clear as the liquid resin penetrates its surface, which clarity remains after the clear penetrating resin 22 has cured, therein creating a clear homogenous mix 48 with or without an integrated image layer.

Figure 3:
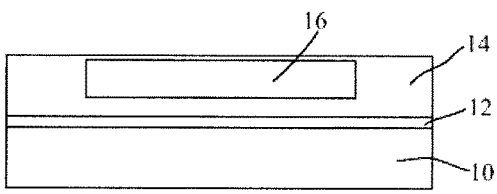

FIG. 3 is a cross section the same as FIG. 2 with the addition of an absorbable inkjet layer 16 printed using a digital inkjet printer using water-based pigment ink.

Figure 4:
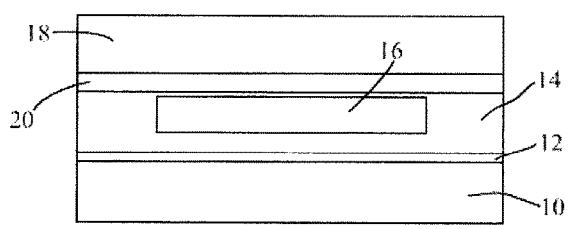

FIG. 4 is a cross section the same as FIG. 3 with the addition of a second releasable carrier, comprised; a silicone release paper or another material with similar release characteristics 18 and an adhesive 20. The purpose of the second releasable carrier 18 is to transport the adhesive 20, which may comprise a hot melt, a silicone, an acrylic, a rubber, an epoxy or any other such adhesive formulation required to affect the desired adhesion properties. Referring now to this preferred embodiment, the application of an adhesive element requires that it can be adhered to a surface by the use of pressure. Adhesives of this type are called pressure sensitive and there are of course different types of pressure sensitive adhesives which could be considered, the most appropriate adhesive of the preferred embodiment herein described is a hot melt pressure sensitive, which offer advantages deemed relevant the present invention. Pressure sensitive hot melt adhesives (PSHMA) are 100% solids so contain no water, they have high tack performance and have unlimited open time, meaning that they can be bonded to another surface at any time. PSHMA's can be easily adjusted and modified to achieve very diverse adhesion performance. It is a feature of the adhesive element herein described to be customizable based on the requirements of the material surface it is to be applied to.

Figure 5:
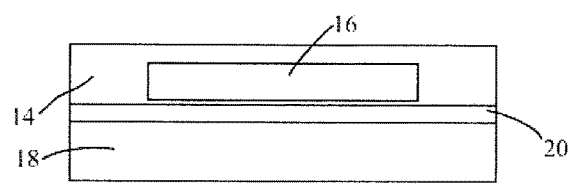

FIG. 5 is a cross section the same as FIG. 4 with the removal of a first releasable carrier 10 thereinafter being transposed. Transposed image layer constructions of the type described in this preferred embodiment are to be considered to be exemplary. A transposed image layer construction provides for the printed top surface of the absorbable layer 14 to be transported to the underlying surface of the absorbable layer, significantly noticeable as the image face after transposing will appear muted as it will be situated under the white microporous surface and will remain muted until the penetrating resin 22 is applied, at which point the white microporous surface of the absorbable layer 14 will gradually become clear, thereby revealing the true color spectrum and clarity of the printed image layer 16 which image clarity will remain thereafter.

Figure 6:
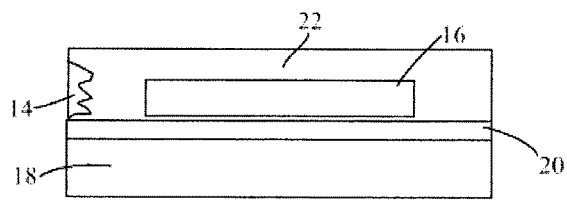
Figure 7:
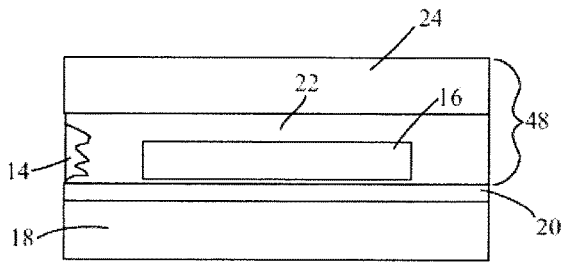

FIG. 7 is a cross section the same as FIG. 6 with the addition of a top coat resin layer 24 which layer is cross linkable with the penetrating resin layer 22 thereinafter creating a clear homogenous mix 48.

Figure 8:
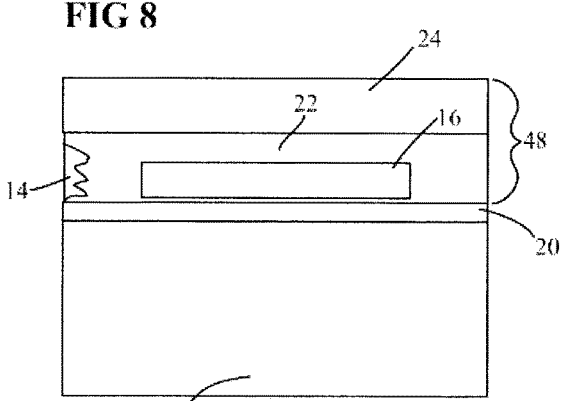

FIG. 8 is a cross section the same as FIG. 7 having been applied to a hard surface construction material 26, thereby completing the steps of making an integrated image layer construction, creating a clear homogenous mix 48 and applying it to a hard surface construction material. Transposed image layer constructions of the type herein described in the steps above, are beneficial to the preferred embodiment of the present invention in several ways, firstly, being underneath the absorbable layer 14 gives the image additional layer protection, which is determined by both the thickness of the top coat layer and its physical performance characteristics, which characteristics can be modified according to the requirements of the different target surfaces, for example the top coat performance for wall tiles would be different to floor tiles. Another benefit of a transposed layer construction is the ability to grind, sand and polish the surface of the transposed integrated image layer construction, to a depth of 140-200 microns before it starts abrading the ink, which ink is absorbed approximately 20 microns into the surface of the integrated layer construction before the layers have been transposed.

Figure 9:
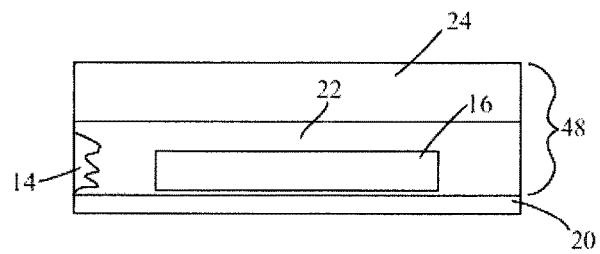
FIG. 9 is a cross section the same as FIG. 7 with the removal of a second releasable carrier.

FIG. 9 is a cross section the same as FIG. 7 with the removal of a second releasable carrier 18.

Figure 10:
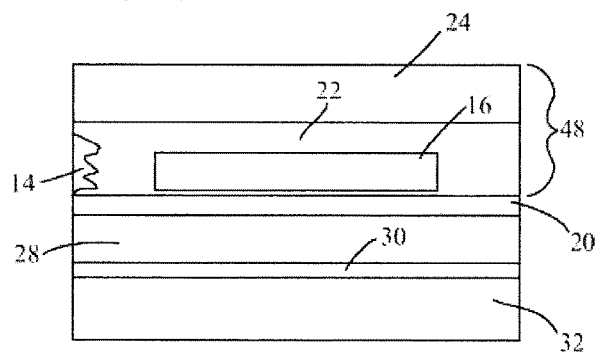
FIG. 10 is a cross section the same as FIG. 9 with the addition of an intermediate sheet, coated on one side with an adhesive, provided with a third releasable carrier.
Figure 11:
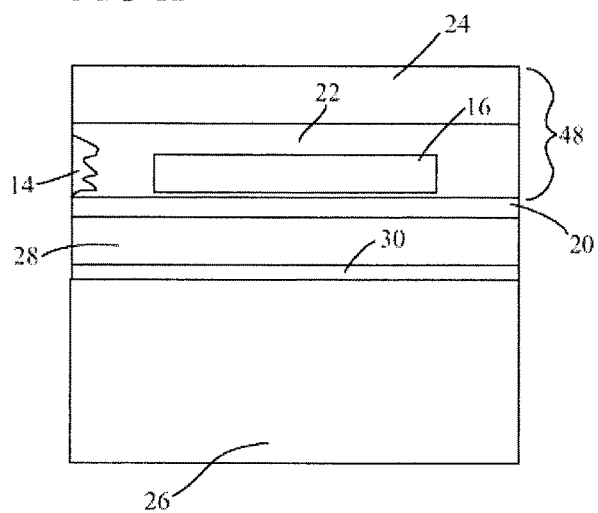
FIG. 11 is a cross section the same as FIG. 10 with the removal of a third releasable carrier, from the intermediate sheet, thereafter applying the underlying adhesive layer of the intermediate sheet to a hard surface construction material.
Figure 12:
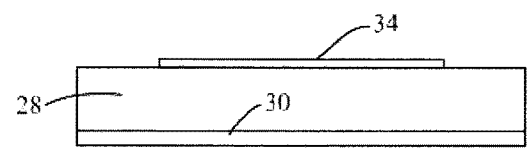
FIG. 12 is a cross section of an intermediate sheet coated on one side with an adhesive, provided with a third releasable carrier with the addition of a special effect layer.
Figure 13:
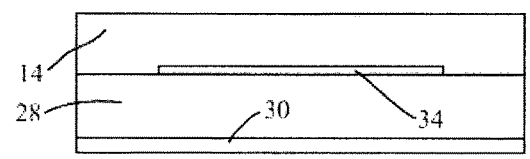
FIG. 13 is a cross section the same as FIG. 12 with the addition of an absorbing layer.
Figure 14:
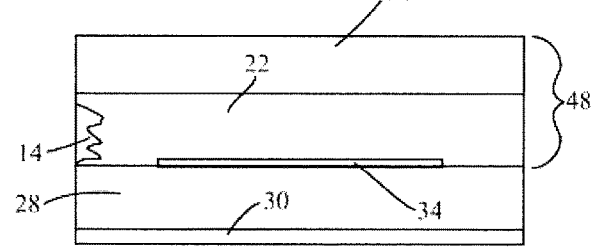
FIG. 14 is a cross section the same as FIG. 1 with the addition of a penetrating resin and topcoat resin, creating a clear homogenous mix without the inclusion of an integrated image layer.
Figure 15:
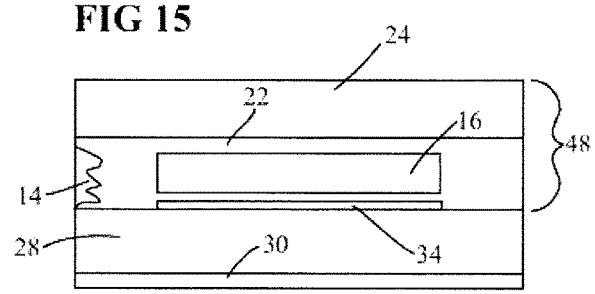
FIG. 15 is a cross section the same as FIG. 14 with the addition of a penetrating resin and a topcoat resin, creating a clear homogenous mix with the inclusion of an integrated image layer.

FIG. 10 is a cross section the same as FIG. 9 with the addition of an intermediate sheet 28 coated on one side with an adhesive 30 which adhesive may be pressure sensitive, which sheet may comprise a thin gauge plastic material, which may comprise high impact polystyrene of a thickness of 250-500 microns, which material may be opaque or of a varying translucency, which may also conveniently be colored white. A number of different embodiments and objects of the present invention referencing intermediate sheet layer constructions when applied to target surfaces, are detailed herein, most noticeably and therefore most importantly, the ability to apply special effects to the surface of the intermediate sheet independently of the integrate image layer construction. For example; printing the surface of the thin gauge plastic sheet with a reversed out black and white laser toner printed design, which may be a repeatable pattern; heat applying a heat activated transfer foil, which may comprise, a metallic, diffraction, holographic or other transfer foil effect; placing the foil over the laser printed design affixed to the intermediate sheet; applying heat and pressure, which may be with a heated roller assembly; peeling the foil from the intermediate sheet, thereby revealing the foil effect on any area that was previously printed with toner.

FIGS. 10-15 detail the steps of making and applying intermediate sheet constructions using one or more types of special effects. It should be understood that someone with ordinary skill in the art would be able to include many different types of special effects on intermediate and apply the in the manner described in the objects herein described.

Figure 16:
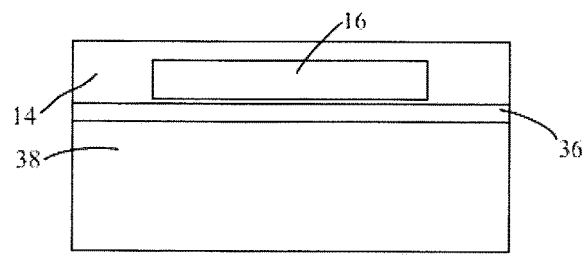
FIG. 16 is a cross section the same as FIG. 3 with the omission of a second releasable carrier and the inclusion of a forth releasable carrier, thereafter, removing the forth releasable carrier, applying the revealed porous pressure sensitive adhesive to a porous hard surface construction material.

FIG. 16 is a cross section the same as FIG. 3 with the use of a porous pressure sensitive adhesive layer 36 used to enable the integrated image layer construction to be temporarily affixed to a surface, before making it permanently affixed after creating a clear homogenous mix 48. Such surface includes a porous surface 46 which may comprise concrete. According to another embodiment of the present invention, there is provision for a porous adhesive layer 36 to be printed to the face of the absorbable layer 14, peeling the second releasable carrier 18 cleanly away from printed face of the absorbable layer 14 and thereafter applying the porous adhesive face of the absorbable layer 14 to a porous hard surface 46.

Figure 17:
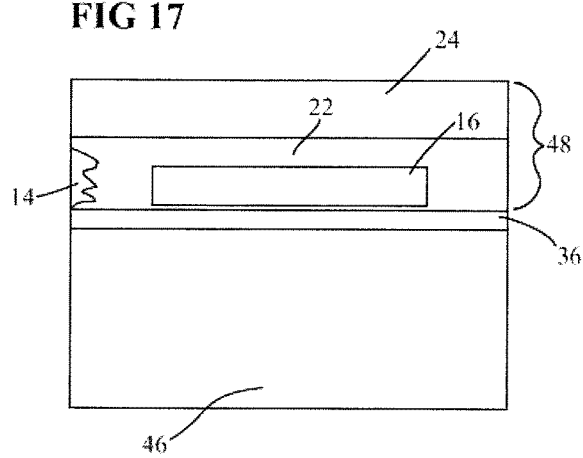
FIG. 17 is a cross section the same as FIG. 16 with the addition of a penetrating resin and a topcoat resin, creating a clear homogenous mix with the inclusion of an integrated image layer.

FIG. 17 shows the result of integrating an image layer construction into a hard porous surface 46, applying a penetrating resin layer 22 formulated to integrate the image layer 16 the absorbable layer 14 and the porous surface, curing the penetrating resin 22 thereafter applying a hard, top coat resin layer 24 to the penetrating resin layer 22 curing the hard coat resin layer 24 thereby creating a clear homogenous mix 48 which includes the porous surface 46 resulting in a hard, durable, resistant form of decoration.

Figure 18:
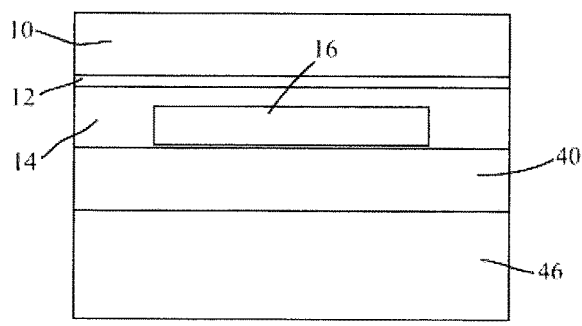
FIG. 18 is a cross section the same as FIG. 3 having been transposed, applied to a liquid resin.

FIG. 18 is a cross section the same as FIG. 3 with the layers having been transposed. According to another embodiment of the present invention, there is provision for a liquid resin 40 which curing process is exothermic, which resin may be epoxy. It is a feature of a liquid epoxy resin to comprise a resin and a hardener, mixing the resin and hardener together prompts an exothermic reaction 42 thereby generating heat, turning the liquid into a solid. It is a feature of the exothermic reaction 42 for the resin to become tacky when hot and dry to the touch when the exothermic reaction 42 has finished. FIG. 18 shows the transposed printed absorbing layer 14 absorbing to the liquid resin 40 before the exothermic reaction 42.

Figure 19:
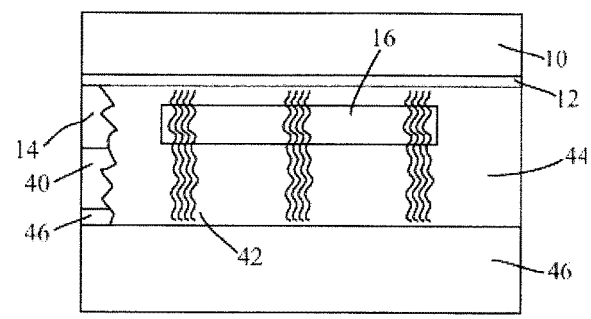
FIG. 19 is a cross section the same as FIG. 18 wherein the liquid resin is having an exothermic reaction, causing it to harden and create a clear homogenous mix.
Figure 20:
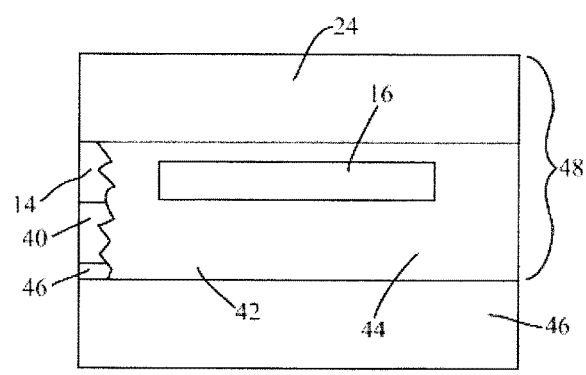
FIG. 20 is a cross section the same as FIG. 19 wherein the exothermic reaction has finished its cycle and the first releasable carrier has been removed from the upper surface of the clear homogenous mix, optionally there is provision for the clear homogenous mix to be extended by the addition of a hard topcoat resin, which action may be repeatable.

FIGS. 19-20 show the exothermic reaction 42 of the resin 40, which exothermic reaction causes the image absorbing layer 14, the epoxy resin 40 and the target surface 46 to become one, thereafter resulting in a clear homogenous mix of the type that includes a hard surface construction material, which material may be concrete.

While the disclosed subject matter has been described in conjunction with a number of embodiments, it is evident that many alternatives, modifications and variations would be, or are, apparent to those of ordinary skill in the applicable arts. Accordingly, applicant intends to embrace all such alternatives, modifications, equivalents and variations that are within the spirit and scope of the disclosed subject matter.

What is claimed is:

1. A method of making an integrated image layer construction, comprising the steps of: coating a first releasable carrier with an absorbable layer;
   printing said absorbable layer with an absorbable ink to form a printed face;
   coating a second releasable carrier with an adhesive layer;
   applying the adhesive layer to the printed face of the absorbable layer;
   peeling the first releasable carrier cleanly away from the absorbable layer;
   applying a penetrating resin layer formulated to integrate the printed face into the absorbable layer;
   curing the penetrating resin layer;
   applying a hard top coat resin layer to the penetrating resin layer;
   exothermically curing the hard coat resin layer, thereby creating a clear homogenous mix;
   peeling away the second releasable carrier; and
   applying the adhesive layer to a hard surface construction material to form a decoration.

2. An integrated image layer construction comprising:
   a first releasable carrier with an absorbable layer;
   a printed face formed on the absorbable layer with an absorbable ink;
   a second releasable carrier with an adhesive layer;
   a penetrating resin layer formulated to integrate the printed face into the absorbable layer wherein the penetrating resin is cured;
   a hard top coat resin layer applied to the penetrating resin layer;
   wherein the hard coat resin layer is cured exothermically thereby creating a clear homogenous mix which after away the second releasable carrier is peeled away allows the adhesive layer to be applied to a hard surface construction material to form a decoration.

3. The integrated image layer construction of claim 2 wherein the first releasable carrier is paper laminated with a thin gauge polypropylene material.

4. The integrated image layer construction of claim 2 wherein the second releasable carrier is constructed of paper coated with a high release material.

5. The integrated image layer construction of claim 2 wherein the adhesive layer on the second releasable carrier is a pressure sensitive adhesive.

6. A method of making an integrated image layer construction, comprising the steps of:
   coating a first releasable carrier with an absorbable layer;
   printing said absorbable layer with an absorbable ink to form a printed face;
   coating a second releasable carrier with an adhesive layer;
   coating an intermediate sheet with an adhesive layer;
   pressing the absorbable layer to the adhesive layer of the intermediate sheet;
   coating a third releasable carrier with an adhesive layer;
   peeling the first releasable carrier cleanly away from the absorbable layer;
   applying a penetrating resin layer formulated to integrate the printed face into the absorbable layer;
   curing the penetrating resin;
   applying a hard top coat resin layer to the penetrating resin layer;
   exothermically curing the hard coat resin layer, thereby creating a clear homogenous mix which includes the intermediate sheet;
   peeling away the third releasable carrier from the intermediate sheet; and
   applying the adhesive layer on the third releasable carrier to a target surface to form a decoration.

7. An integrated image layer construction comprising:
   a first releasable carrier with an absorbable layer;
   said absorbable layer printed with an absorbable ink to form a printed face;
   a second releasable carrier with an adhesive layer;
   an intermediate sheet with an adhesive layer;
   the absorbable layer pressed to the adhesive layer of the intermediate sheet;
   a third releasable carrier with an adhesive layer;
   the first releasable carrier being cleanly away from the absorbable layer;
   a penetrating resin layer applied to the printed face formulated to integrate the printed face into the absorbable layer and allowed to cure;
   a hard top coat resin layer applied to the penetrating resin layer and allowed to cure exothermically, thereby creating a clear homogenous mix which includes the intermediate sheet, wherein
   when the third releasable carrier is peeled away from the intermediate sheet the adhesive layer on the third releasable carrier can be applied to a target surface to form a decoration.

8. A method for making an integrated image layer construction comprising of the steps of:
   coating a first releasable carrier with an absorbable layer;
   printing said absorbable layer with an absorbable ink;
   applying a liquid resin to a hard porous construction material, said liquid resin of a type that cures by an exothermic reaction;
   applying the printed absorbable layer face down onto the surface of the liquid resin, so as to contact the two surfaces together, before, during and after the exothermic reaction; thereafter peeling the first releasable carrier from the hardened resin surface, therein revealing a clear homogenous mix; and applying a hard top coat resin to the clear homogenous mix, resulting in a hard, durable, resistant form of decoration.

\* \* \* \* \*